(12) United States Patent
Hendrik De Greef

(10) Patent No.: US 7,228,958 B2
(45) Date of Patent: Jun. 12, 2007

(54) SUPPORTING BODY, CONVEYOR COMPRISING A NUMBER OF SUPPORTING BODIES AND METHOD FOR TRANSVERSALLY ALIGNING OBJECTS

(75) Inventor: Jacob Hendrik De Greef, BM Waardenburg (NL)

(73) Assignee: De Greef's Wagen-, Carrosserrie- en Machinebouw B.V., Tricht (NL)

( * ) Notice: Subject to any disclaimer, the term of this patent is extended or adjusted under 35 U.S.C. 154(b) by 106 days.

(21) Appl. No.: 10/518,163

(22) PCT Filed: Jun. 16, 2003

(86) PCT No.: PCT/NL03/00437

§ 371 (c)(1),
(2), (4) Date: Apr. 29, 2005

(87) PCT Pub. No.: WO03/106308

PCT Pub. Date: Dec. 24, 2003

(65) Prior Publication Data

US 2005/0205391 A1    Sep. 22, 2005

(30) Foreign Application Priority Data

Jun. 14, 2002 (NL) .................................. 1020865

(51) Int. Cl.
*B65G 17/32* (2006.01)
(52) U.S. Cl. ........................ 198/779; 198/385; 198/387
(58) Field of Classification Search ................ 198/779, 198/387, 384–385
See application file for complete search history.

(56) References Cited

U.S. PATENT DOCUMENTS

| | | | | |
|---|---|---|---|---|
| 1,867,522 A | * | 7/1932 | Noffsinger | 209/701 |
| 2,919,787 A | | 1/1960 | Reck et al. | 198/30 |
| 2,961,087 A | * | 11/1960 | Reading | 198/387 |
| 3,144,121 A | | 8/1964 | Smith | 198/33 |
| 3,147,844 A | * | 9/1964 | Mountz | 198/458 |
| 3,591,999 A | | 7/1971 | Mingotti | 53/214 |
| 3,794,161 A | * | 2/1974 | Peterson | 209/540 |
| 5,101,982 A | * | 4/1992 | Gentili | 209/556 |
| 5,611,419 A | * | 3/1997 | LaVars | 198/370.04 |
| 2003/0156281 A1 | * | 8/2003 | Crezee et al. | 356/243.1 |

FOREIGN PATENT DOCUMENTS

| | | |
|---|---|---|
| EP | 0 230 583 | 8/1987 |
| EP | 0 230 583 A2 * | 8/1987 |
| EP | 0 732 265 | 9/1996 |
| FR | 2 190 670 | 2/1974 |
| GB | 1 064 031 | 4/1967 |
| WO | WO 00 05159 | 2/2000 |
| WO | WO 200005159 A1 * | 2/2000 |
| WO | WO205016799 A3 * | 2/2005 |

* cited by examiner

*Primary Examiner*—Mark A. Deuble
(74) *Attorney, Agent, or Firm*—Needle & Rosenberg, P.C.

(57) ABSTRACT

Conveyor (1), comprising a number of supporting bodies (10) arranged successively in an array in order to form transporting positions for objects (P) for transporting between two successive supporting bodies (10), wherein the form of the supporting bodies (10) is suitable for urging the objects (P) into a transverse position relative to the direction of movement (B).

18 Claims, 4 Drawing Sheets

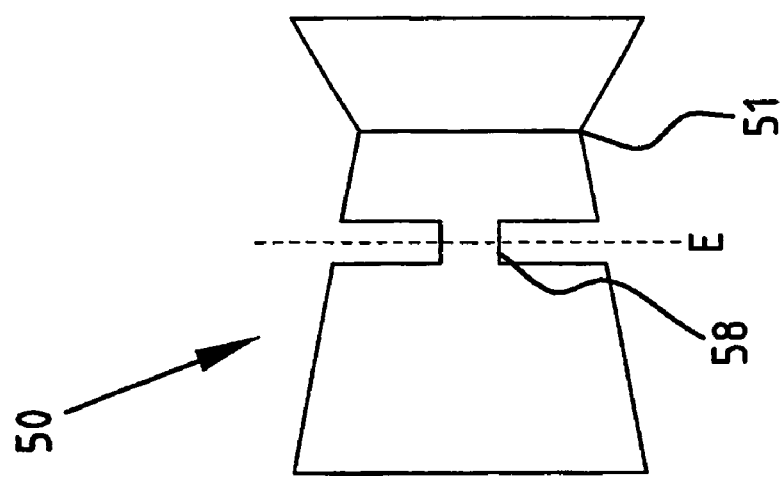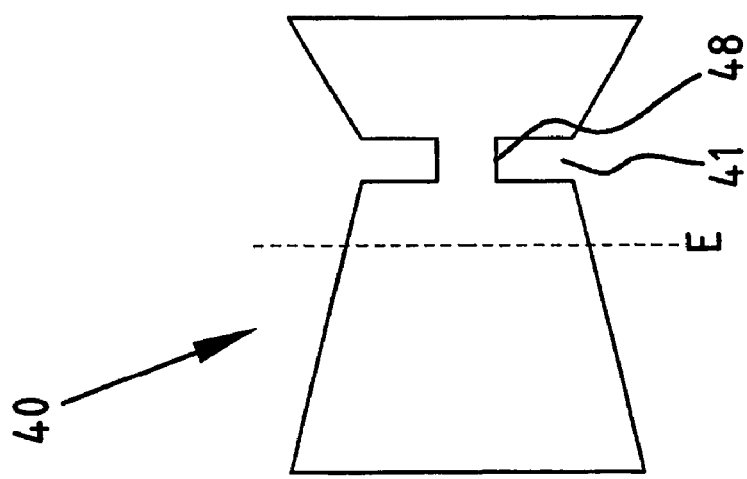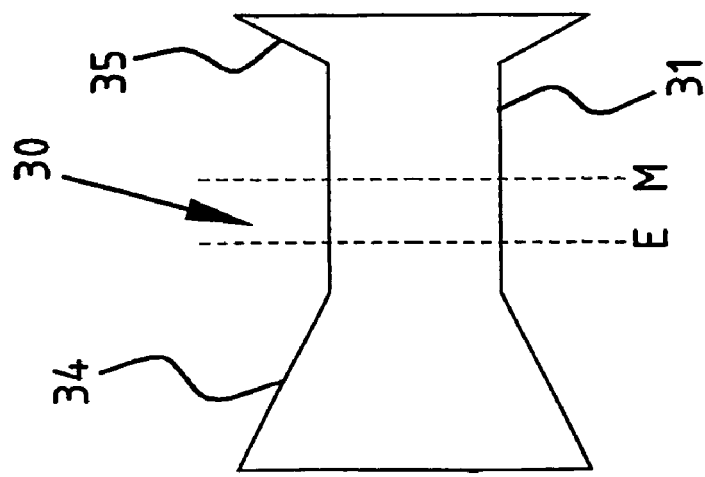
FIG. 2

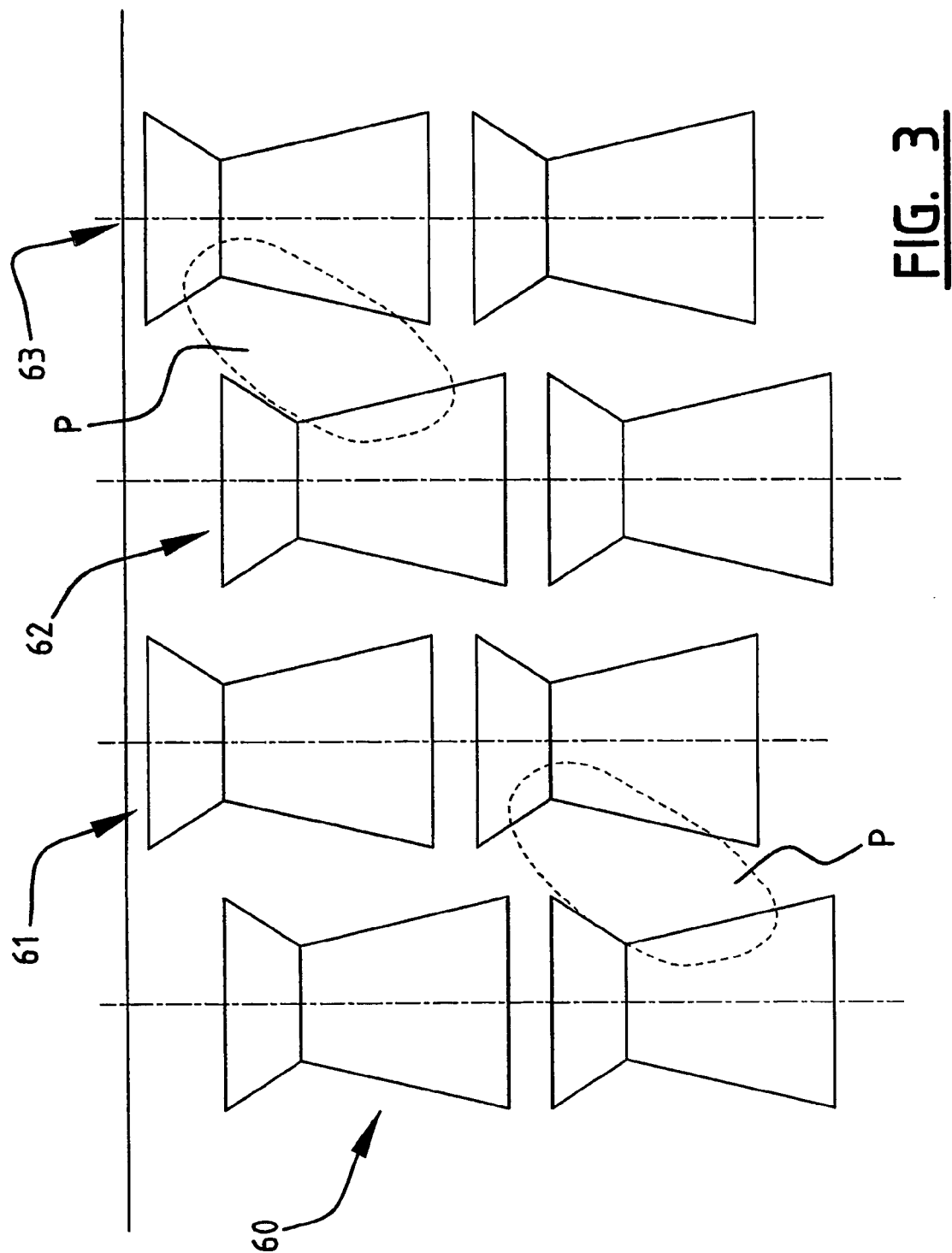

SUPPORTING BODY, CONVEYOR COMPRISING A NUMBER OF SUPPORTING BODIES AND METHOD FOR TRANSVERSALLY ALIGNING OBJECTS

CROSS-REFERENCE TO RELATED APPLICATION

The present application claims priority to Netherlands Patent Application No. 1020865, filed Jun. 14, 2002, which application is incorporated herein fully by this reference.

The present invention relates inter alia to a conveyor, for instance for sorting devices for sorting large batches of discrete objects. Such sorting devices are much used in the potato, vegetable and fruit sector.

In such sorting devices the objects for sorting are singulated to enable measurement data to be linked to an object. For this singulating use is usually made of so-called diabolo conveyors. A plurality of diabolos are herein arranged successively in the conveyor, whereby objects can be situated in the openings between two successive diabolos. Such conveyors perform very well in practice.

Substantially round objects such as fruit that have heretofore generally been sorted in practice. More recently there has developed a need to sort objects with a more random form. Here can for instance be envisaged potatoes which do not have substantially a round form. In the above described conveyors these objects act in agitated manner because of their shape, which results in damage among other things.

In order to prevent such a drawback, the present invention provides a conveyor comprising a number of supporting bodies arranged successively in an array in order to form transporting positions for objects for transporting between two successive supporting bodies, wherein the form of the supporting bodies is suitable for urging the objects into a transverse position relative to the direction of movement.

Because the objects are urged into a transverse position, the objects will take on a more stable position in the conveyor. Damage due to excessive movement of the objects for instance is hereby prevented. A further advantage is that, owing to the improved position, the objects can be better assessed by measuring systems such as optical measuring systems. A further advantage hereof is that due to the less agitated situation, fewer vibrations are generated in the conveyor, thus bringing about a smooth transport. In addition, possible wear of the conveyor is hereby reduced. A further disruption caused by elongate objects in such a conveyor is that an object could flip over from a first transporting position, or opening, to a second one. A measurement on the object will hereby be pointless if the jumping takes place after the measurement.

In an embodiment according to the present invention, the transporting positions have an at least partly elongate form. This elongate form has an advantageous effect on the positioning of the objects in the transporting positions.

In a further preferred embodiment the supporting bodies comprise a narrowed portion asymmetrically as seen transversely of the transporting position, wherein these bodies are arranged in alternating orientation in the conveyor. This results on the one hand in a substantially elongate form of the transporting positions, and on the other the urging of the objects in the longitudinal direction is hereby enhanced, for instance because there may be a difference in speed of two successive peripheries of two successive supporting bodies.

In a further preferred embodiment the supporting bodies are substantially diabolo-shaped, wherein the centre of the diabolos is positioned eccentrically. The eccentric positioning of the centre of the diabolos causes, among other things, the elongate form of the transporting positions. It is herein recommended that the centre of the diabolo is positioned eccentrically relative to the conveyor.

In a further preferred embodiment the narrowed portion comprises a part of substantially constant thickness which is bounded on both sides by a tapering widened portion. This embodiment has substantially the same advantages.

The supporting bodies can preferably be driven rotatably. The above stated differences in speed on the surfaces of the supporting bodies are caused by the peripheral speed of the supporting body due to this rotation.

In a further preferred embodiment the conveyor further comprises urging means for urging the objects in a longitudinal direction relative to the conveyor. This embodiment has the advantage, among others, that the objects are placed centrally in the transporting position, for instance at the beginning of the conveyor. The objects can hereby be positioned in suitable manner from the central positions into the transverse direction during transport.

The urging means preferably comprise at least one rotating element. This has the advantage, among others, that a continuous operation of the urging means can be achieved. The urging means preferably comprises a rotating element such as a brush. Pushing against the objects can hereby be carried out in gentle or protective manner, which prevents damage. In a further preferred embodiment the conveyor comprises a feed conveyor for supplying the objects. This feed conveyor comprises for instance a flat belt, V-belt and/or troughed belt, or a water channel. Both variants have advantages known to the skilled person.

A further aspect of the invention relates to a supporting body, comprising:

at least one side wall with a body extending therebetween, wherein said body comprises a narrowed portion asymmetrically, mounting means for mounting the supporting body.

This supporting body further has the above stated advantages when it is for instance applied in a conveyor as described above.

A further aspect of the present invention relates to a sorting device comprising a conveyor as described above. This conveyor preferably comprises supporting bodies as specified above.

A further aspect of the present invention relates to a method for orienting elongate products, comprising steps for:

supplying elongate objects on a number of successively arranged supporting bodies as specified above or on a conveyor as specified above, rotating the supporting bodies to set the objects into movement.

The above described advantages, among others, are achieved by positioning the objects in the transverse direction relative to the direction of forward movement of the conveyor.

Further advantages, features and details will be described on the basis of embodiments, making reference to the annexed figures, wherein:

FIGS. 2 and 3 are schematic top views of further embodiments of the transport rollers according to the present invention.

A preferred embodiment 1 (FIG. 1) of a device according to the present invention comprises a conveyor 1 in which diabolo-shaped transport rollers 10 (transporting elements) are arranged successively. Situated between the transport rollers 10 are individual transporting openings or transporting positions. Because these transporting positions are distinguishable, objects situated therein for sorting, such as potatoes (not shown) or pears P, can be transported as an individually distinguishable unit. It hereby becomes possible to carry out measurements on these fruits, as is usual in sorting devices. Colour measurement, weight measurement, hardness measurement and further types of measurement which are usual in sorting devices can for instance be envisaged here.

Figure 5:
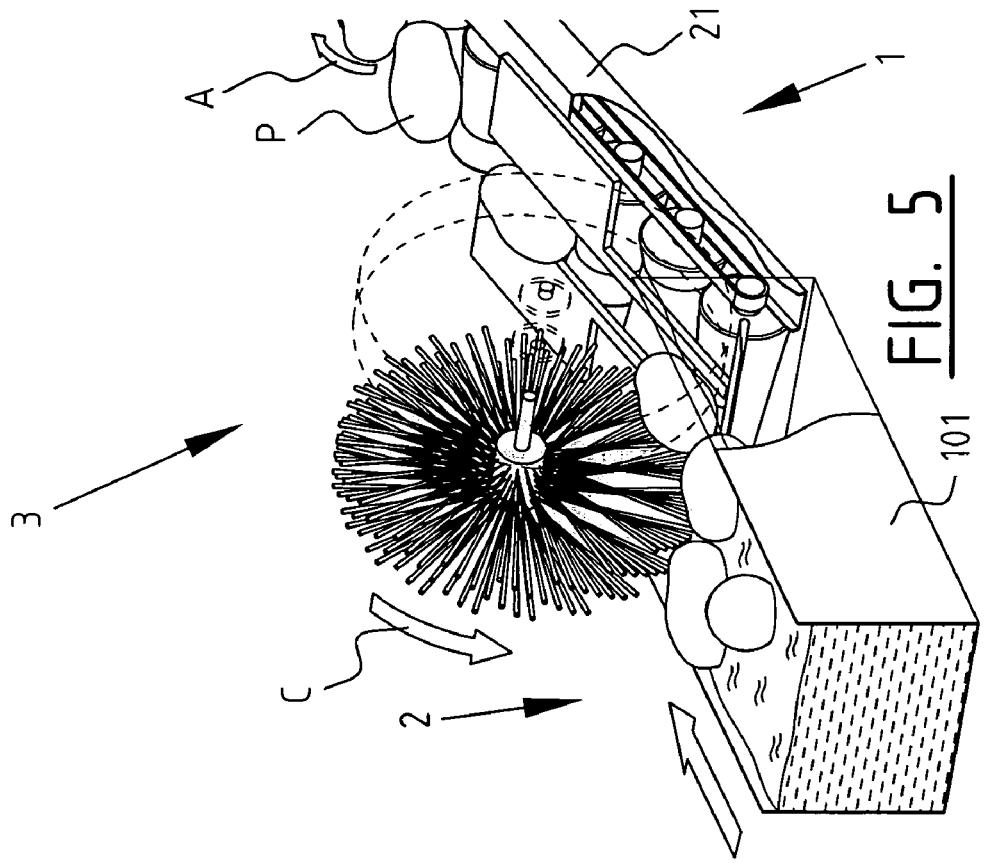
FIGS. 4 and 5 are partly cut away perspective views of further embodiments of the present invention showing alternative feed conveyors.
Figure 4:
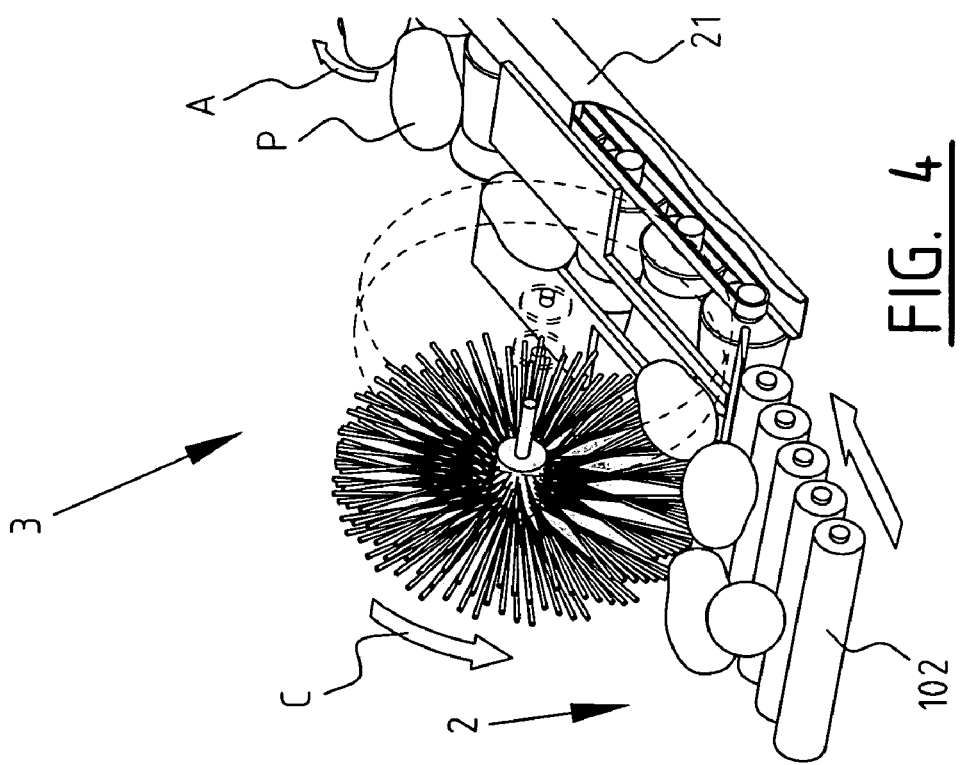

A feed conveyor 2 is provided for supplying the objects P. Objects are supplied on this feed conveyor unsorted and in bulk, whereafter they are placed in the usual manner in the transporting positions of conveyor 1 as identifiable objects. Variants of the feed conveyor 2 include a conveyor belt 100 (FIG. 1), a roller track 102 (FIG. 4), or a water channel 101 (FIG. 5).

In order to have the transfer of objects P proceed in a suitable manner there are provided centring brushes 3 for placing the objects P individually in successive transporting positions. A further effect of brush 3 is that elongate objects are urged into the transporting positions in longitudinal direction relative to the transport direction of conveyor 1. This has the advantage that the subsequent urging of the objects in the transverse direction relative to the transport direction by rotating the transport rollers takes place in a controlled manner. Objects hereby act more sedately during the transport and there are fewer disturbances in the singulating action. Elongate objects in particular which rotate over the longitudinal direction of the objects, i.e. about the shortest diameter, will cause an agitated singulating effect due to relatively violent movements, whereby mis-measurements can occur. The above described method helps to reduce this.

Transport rollers 10 have an asymmetrical design. These transport rollers comprise two substantially round end surfaces 12,13. Transport rollers 2 further comprise inwardly tapering bearing surfaces 14,15 which converge in a waist 11. Bearing surfaces 14,15 are herein of different length relative to side walls 12,13, whereby the waist is positioned eccentrically. Two successive transport rollers 10 are arranged in the conveyor with waist 11 in alternate orientation such that elongate transporting positions are created.

End surfaces 12,13 of transport roller 10 are further provided with mounting means 16 for mounting the transport roller in the conveyor. In this embodiment these mounting means 16 are provided with rotation means for rotating thereof about the axis of the transport roller. Due to this rotation and due to the elongate form of the transporting position an elongate object P will be urged into a transverse direction in relation to the transport roller, which is an object of the present invention.

Using rotating means such as for instance a toothed wheel or a pulley, the mounting means 16 engage in rotation drive belt or chain 18 in a side frame 21 of conveyor 1 in order to rotate the transport rollers.

Figure 1:
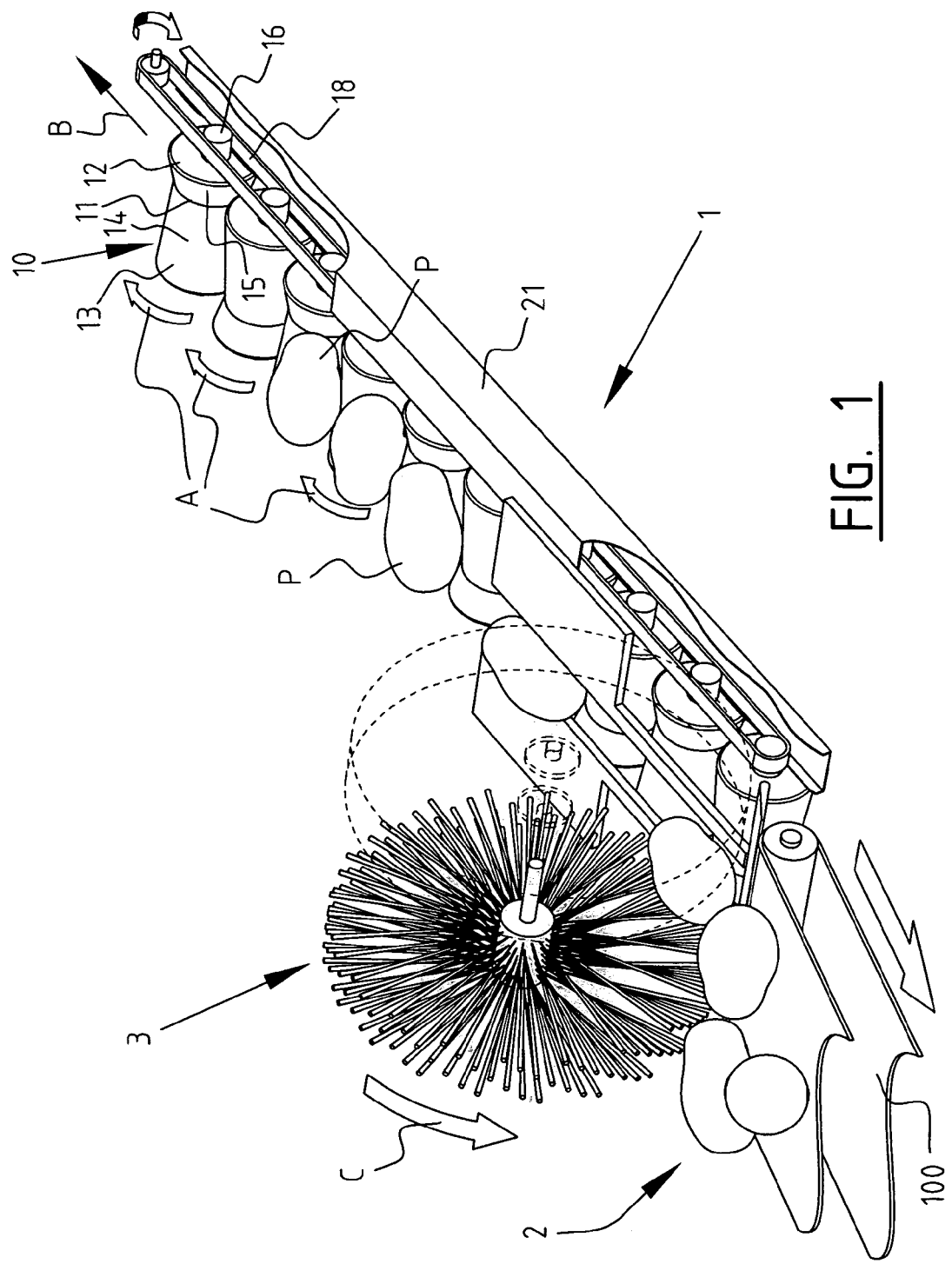
FIG. 1 is a partly cut away perspective view of an embodiment according to the present invention.

A part of conveyor 1 is shown in FIG. 1. The conveyor is an endless loop with transport rollers arranged therein, which advances in the direction of arrow B. The transport rollers therefore move in the direction of arrow B on the one hand and rotate in the direction of arrows A on the other. Brushes 3 rotate in the direction of arrow C.

The urging of the elongate objects P in transverse direction takes place by means of differences in speed between respective surfaces of mutually adjacent parts of two successive transport rollers owing to a difference in diameter, whereby the elongate fruits are rotated in the direction of a transverse position.

Further embodiments of transport rollers are shown schematically in FIG. 2. The broken lines E indicate the centre of the transport roller.

A further embodiment of transport roller 30 (FIG. 2) is likewise provided with an eccentric middle portion 31. Here however, the eccentric middle portion is elongate. The centre of the middle portion is indicated by means of broken line M. Tapering bearing walls 34,35 are provided on either side of this elongate middle portion 31. If a transport roller according to this embodiment is applied alternately in a conveyor, differences in the diameter of two successive transport rollers will also contribute toward urging elongate objects in transverse direction relative to the transport rollers.

A further embodiment of a transport roller 40 is provided with an eccentric waist 41. This waist 41 is provided with a further notch in which measuring instruments can for instance be placed during transport to carry out a measurement on an object lying on the transport roller.

In a further embodiment 50 of the transport roller the waist 51 is likewise situated eccentrically. A notch 58 for the purpose of placing a measuring instrument close to the fruit is arranged in this embodiment in the centre of the transport roller. This has the advantage that the positioning of such a measuring instrument can be arranged in the centre of the conveyor, which has the advantage of a simplified positioning of such a measuring instrument.

A further embodiment (FIG. 3) comprises asymmetrical diabolos 60, 61, 62, 63 which are arranged in the same orientation relative to the conveyors. The diabolos are herein offset slightly in the transporting direction, whereby an elongate opening in which an object can be situated is created between two successive diabolos. This elongate opening has the same function as in above described embodiments.

The transport rollers can be manufactured from diverse materials such as hard or soft plastics, brush bristles, sponge-like materials and further materials typical for the skilled person in conveyors of sorting devices. The invention is not limited to the above described preferred embodiments. Many combinations hereof are possible. The rights sought are set forth in the appended claims.

The invention claimed is:

1. Conveyor, comprising a number of supporting bodies arranged successively in an array in order to form transporting positions for objects between two successive supporting bodies, wherein the form of the supporting bodies is suitable for urging the objects into a transverse position relative to the direction of movement, wherein the supporting bodies comprise a narrowed portion asymmetrically as seen transversely of the transporting direction, wherein these bodies are arranged in alternating orientation in the conveyor, and wherein the narrowed portion comprises a part of substantially constant thickness which is bounded on both sides by a tapering widened portion.

2. Conveyor as claimed in claim 1, wherein the transporting positions are at least partly elongate in form.

3. Conveyor of claim 1, as part of a sorting device further comprising one or more supporting bodies, each supporting body comprising:

at least one side wall with a body extending therebetween, wherein said body comprises a narrowed portion asymmetrically, mounting means for mounting the supporting body.

4. Conveyor as claimed in claim 1, wherein the supporting bodies are substantially diabolo-shaped, wherein the centre of the diabolos is positioned eccentrically.

5. Conveyor as claimed in claim 4, wherein the centre of the diabolo is positioned eccentrically relative to the conveyor.

6. Method for orienting elongate products, comprising steps for:

supplying elongate objects on a conveyor as claimed in claim 1, rotating the supporting bodies to set the objects into movement.

7. Conveyor as claimed in claim 1, wherein the supporting bodies can be driven rotatably.

8. Conveyor as claimed in claim 1, further comprising urging means for urging the objects in a longitudinal direction relative to the conveyor.

9. Conveyor as claimed in claim 8, wherein the urging means comprise at least one rotating element.

10. Conveyor as claimed in claim 9, wherein the rotating element comprises a brush.

11. Conveyor as claimed in claim 1, further comprising a feed conveyor.

12. Conveyor as claimed in claim 11, wherein the feed conveyor comprises a conveyor belt or roller track.

13. Conveyor as claimed in claim 11, wherein the feed conveyor comprises a water channel.

14. Supporting body for a conveyor, comprising:

at least one side wall with a body extending therebetween, wherein said body comprises a narrowed portion asymmetrically, mounting means for mounting the supporting body, wherein the supporting bodies comprise a narrowed portion asymmetrically as seen transversely of the transporting direction, wherein these bodies are arranged in alternating orientation in the conveyor, and wherein the narrowed portion comprises a part of substantially constant thickness which is bounded on both sides by a tapering widened portion.

15. Supporting body as claimed in claim 14, wherein the narrowed portion tapers to a waist as seen from both sides.

16. Supporting body as claimed in claim 15, wherein the waist extends over some distance.

17. Supporting body as claimed in claim 15, wherein the waist comprises an interruption.

18. Method for orienting elongate products, comprising steps for:

supplying elongate objects on a number of successively arranged supporting bodies as claimed in claim 14, rotating the supporting bodies to set the objects into movement.

* * * * *